UNITED STATES PATENT OFFICE.

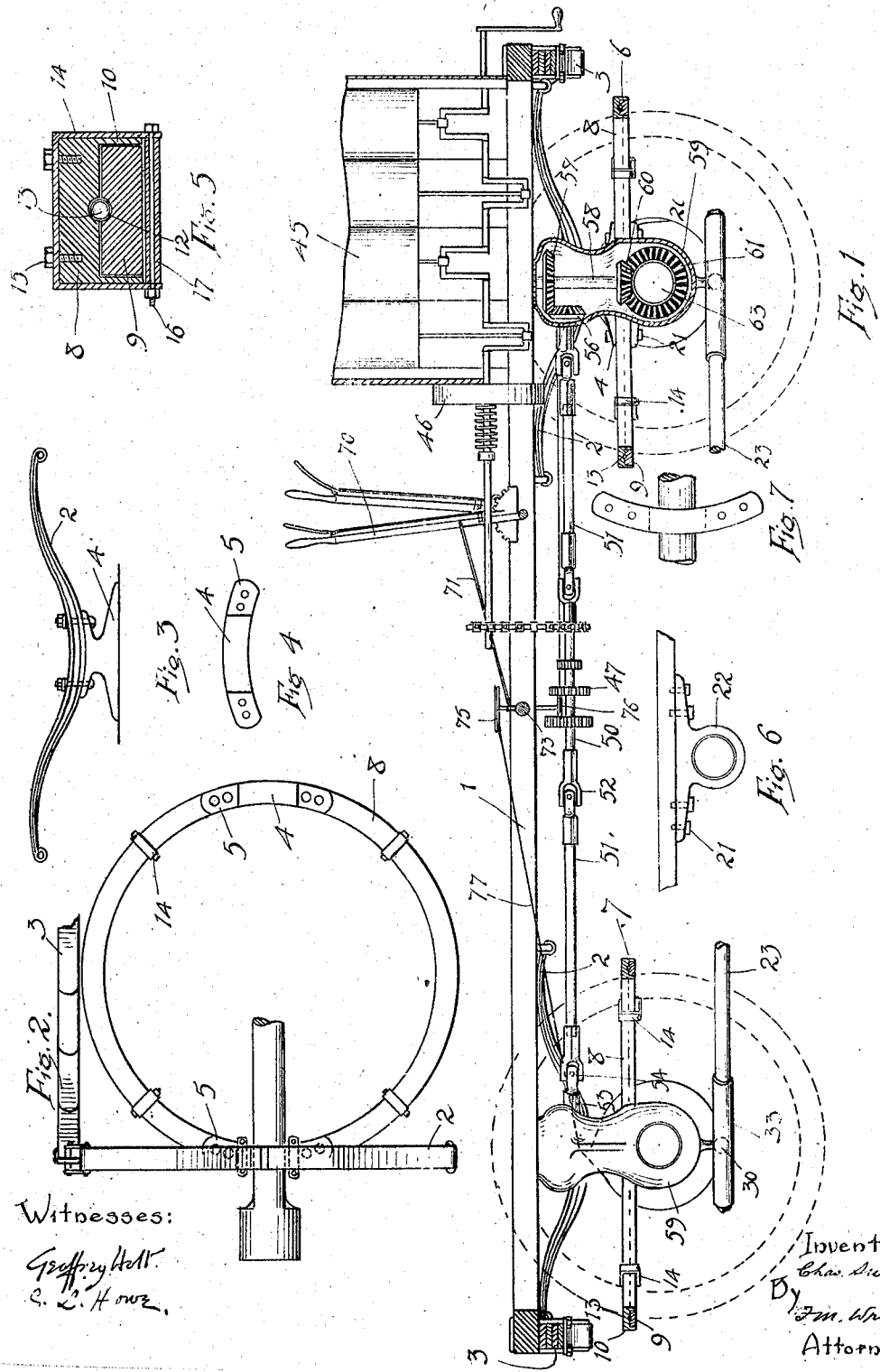

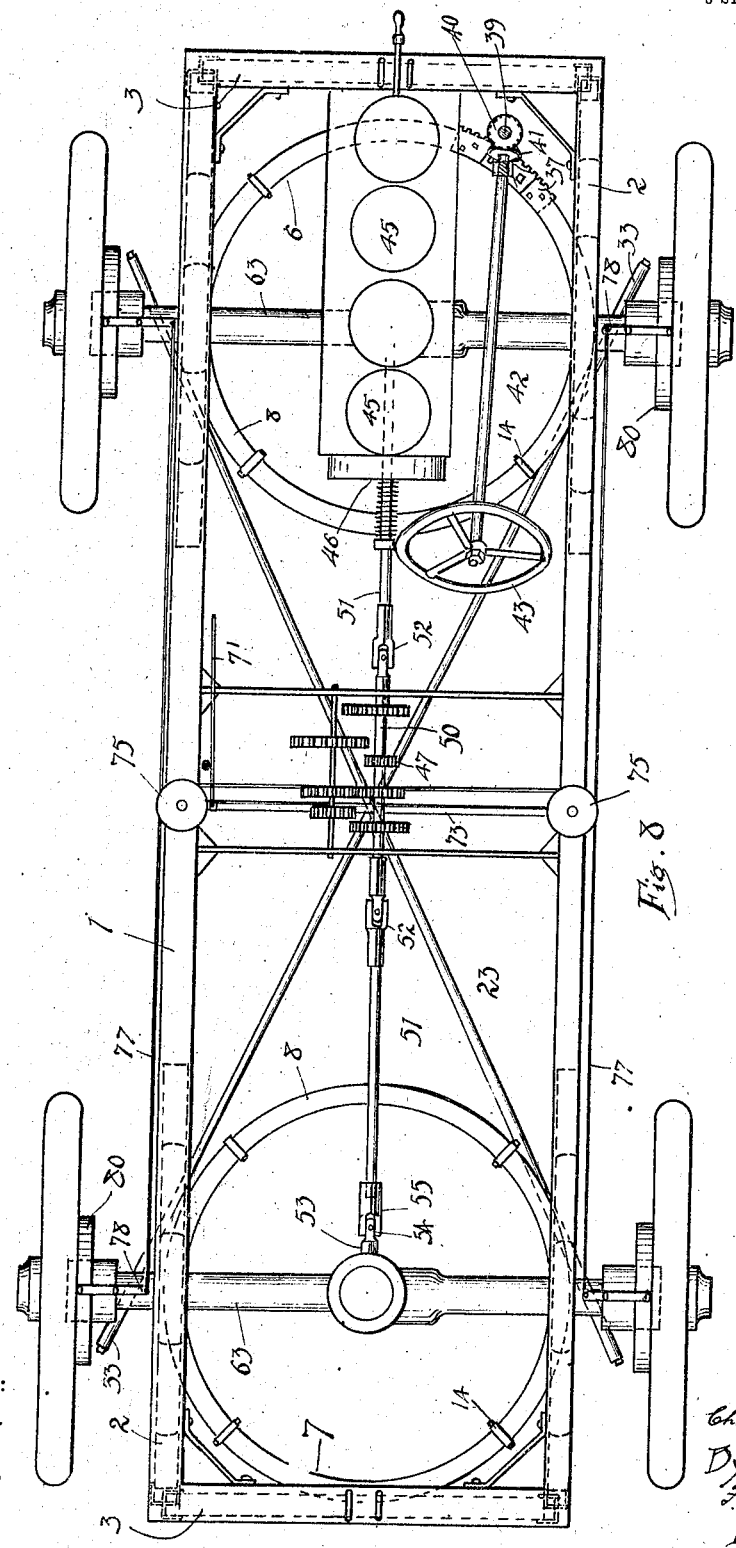

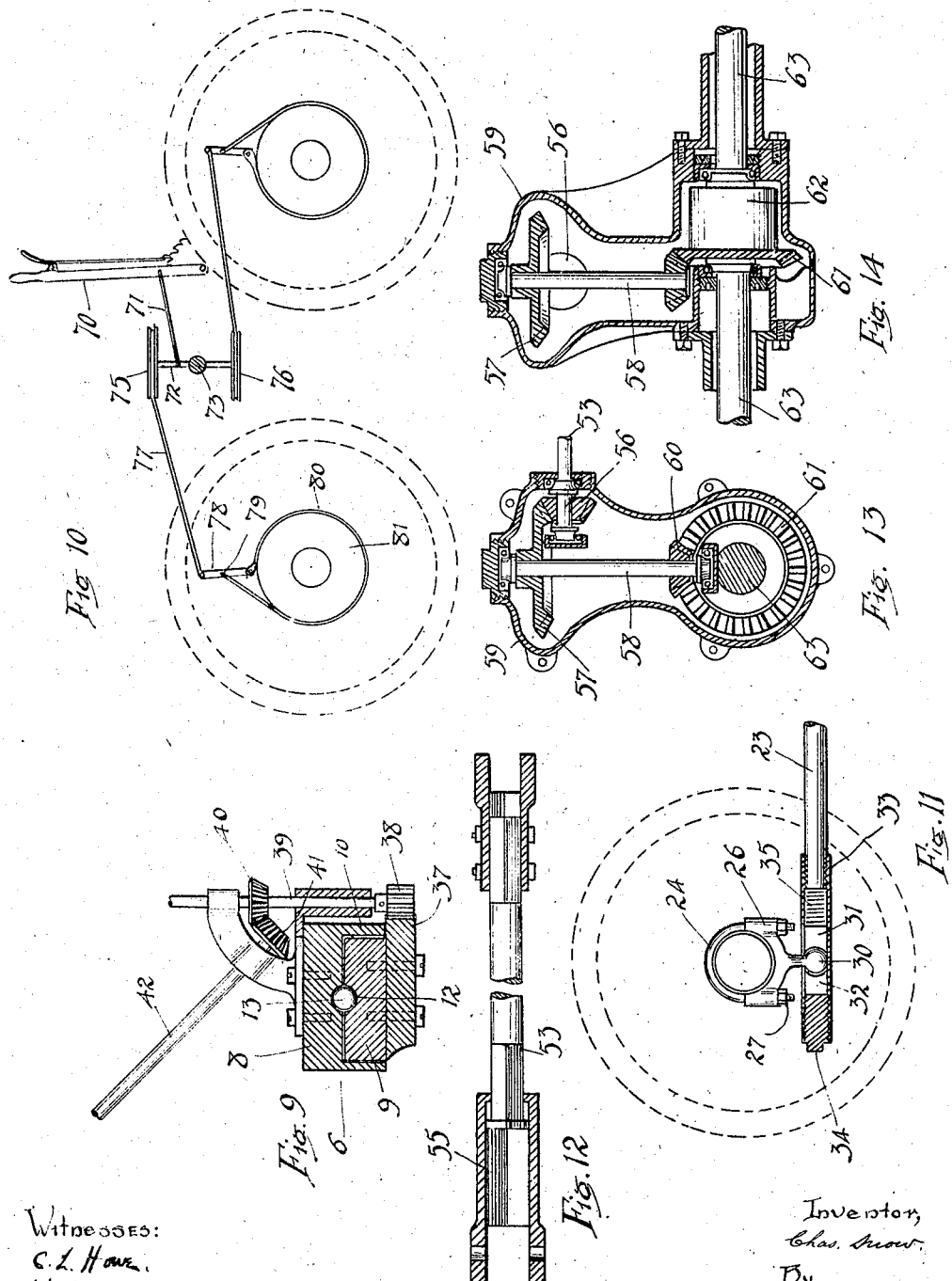

CHARLES SNOW, OF SAN FRANCISCO, CALIFORNIA.

AUTOMOBILE.

No. 893,107.

Specification of Letters Patent.

Patented July 14, 1908.

Application filed April 8, 1907. Serial No. 366,934.

*To all whom it may concern:*

Be it known that I, CHARLES SNOW, a citizen of the United States, residing at San Francisco, in the county of San Francisco and State of California, have invented new and useful Improvements in Automobiles, of which the following is a specification.

The object of the present invention is to provide an improved construction of automobile which shall be simple, and durable, thus rendering it especially valuable for commercial use, and also for country roads having deep ruts and high in the centers, in which the driving power may be applied to both pairs of wheels, in which likewise the braking mechanism can be effectively applied to both pairs of wheels and in which both pairs may be turned for steering.

In the accompanying drawings, Figure 1 is a longitudinal section of the chassis of an automobile equipped with my improvements; Fig. 2 is a plan view of one of the fifth wheels, certain parts being omitted; Fig. 3 is a side view of the spring-supporting block which is bolted to the upper ring of said fifth wheel showing also the side spring thereon; Fig. 4 is a plan view of said block; Fig. 5 is an enlarged sectional view through one of the fifth wheels; Fig. 6 is an end view of an axle casing with part of the fifth wheel thereon; Fig. 7 is a top plan view of the same; Fig. 8 is a plan view of the chassis of the automobile; Fig. 9 is a section through the front fifth wheel showing the connection for the steering rod; Fig. 10 is a detail diagrammatic view of the brake connections; Fig. 11 is a detail view of one of the supporting brackets for the cross reach rods and of said rod; Fig. 12 is a broken longitudinal section of a driving shaft section; Fig. 13 is a vertical section of the connection of the driving shaft with either axle; Fig. 14 is a section at the right angles to Fig. 13.

Referring to the drawing, 1 indicates the frame of the automobile, which may be of steel or armored wood. Said frame is supported at each end by platform springs, that is, two side springs 2 and a transverse spring 3, the latter connected at each end to one of the side springs; so that there is thus formed a very flexible chassis. Each side spring is bolted in the middle to a spring block 4 having a curved base 5, which is secured to the upper ring 8 of a rotary base, or fifth wheel. There are two of these fifth wheels, the front wheel 6 and the rear wheel 7, and the construction is the same for both. Each comprises an upper ring 8 and a lower ring 9, the upper ring having inner and outer flanges 10 extending down close to the inner and outer edges of the lower ring. The inner or opposing horizontal faces of said upper and lower rings are formed with circular grooves 12, forming a runway for balls 13 to permit the upper ring to rotate freely on the lower. To hold said rings together against vertical motion, there are provided at suitable intervals U-clamps 14, which are secured to the upper ring by tap bolts 15, and the lower ends of each clamp form bearings for the shaft 16 of a roller 17 which rolls beneath the lower ring. The flanges 10 and clamps 14 take the place of a king pin used in fifth wheels in general, and allow for the use of the four-wheel steering mechanism hereinafter described. The lower ring of each fifth wheel is secured by tap bolts 21 to an axle casing 22, through which pass the axle sections of the front or rear wheels, as the case may be.

It will be observed that, in this construction, provision has been made for replacing any part without taking apart the whole chassis, as is necessary with cars at present in use. For instance, to remove either the front or the rear axle, it is only necessary to take out the four tap bolts that hold the lower ring on the axle casing, and the axle can be run out from under the chassis. The same principle is adopted in regard to other parts.

By making the various parts reversible and interchangeable, a great increase in length of service is obtained, the service being in some cases doubled by reversing the parts.

The axle casings are connected to each other by reach rods 23, which cross each other diagonally, said connections being made by means of yokes 24 suspended from the axle casings, the threaded ends of each yoke passing through holes formed in a clamp piece 26, nuts 27 being then screwed on said threaded ends. Said clamp piece is formed with a ball-shaped hanger 30 which is received within a socket formed by the concave faces of case-hardened steel blocks 31, 32, contained within a tube 33 screwed at one end upon the end of the reach rod. The other end of the tube is adjustably closed by means of a screw plug 34 which bears against the block 32, while between the other block 31 and the end of the reach rod is interposed a coiled spring 35. This construction furnishes a safe, reliable, and noiseless connection, as the coiled spring always takes up the lost motion and keeps the joint tight. Thus the reaches 23 resiliently connect the wheel axles on opposite sides of the machine, so that the rear axle is always turned in harmony with the front axle so as to follow in the same path, whereby a much shorter turn than heretofore can be made with the same deviation of each axle.

The steering mechanism consists of a segment gear 37 secured on the lower ring of the front fifth wheel, and engaged by a pinion 38 on a vertical shaft 39 carrying a bevel gear 40 engaged by a bevel gear 41 upon the lower end of a steering rod 42 turned by means of the usual hand-wheel 43.

It will be seen that the steering mechanism requires very little power because the upper rings rotate on ball bearings of large size. Again, very little power is required to turn the steering wheel when the car is standing still, because the wheels then merely run on the ground in turning. Moreover, there is no shearing strain on the tires, as in the present system of steering from the two front wheels, either when the car is standing still or when running.

The power shaft may be driven equally well by steam or gasolene engines, or electric motors, but for the purpose of illustration, I have herein shown the power shaft 44 as operated by gasolene engines 45. This shaft is connected with the transmission gear 47 through the usual clutch 46, said transmission gear being now placed in the center of the chassis, and being of any approved construction. The driving shaft is divided into sections, namely, a central section 50 connected with the transmission gear, long intermediate sections 51 connected by universal joints 52 with the central section, and terminal sections 53 connected by universal joints 54 with the intermediate sections and also connected with the axles. Each intermediate section 51 has the fork of its universal joint 52 at its inner end bolted to it, and the fork of its universal joint 54 at its outer end telescoping over it, as shown at 55, so that the driving shaft is slightly extensible, to allow for the slight variation in length as the wheels turn.

It will be observed that the universal joints transmit the power of the driving shaft undiminished when running straight, and on turning an ordinary street corner the universal joint is operated at an angle of about twelve degrees only, so that in such case there is practically no loss in the transmission of the power. Also that the greatest angle at which the driving universal joint is required to work is one of 30 degrees, and this is only used for making extremely short turns.

Each terminal section 53 carries a bevel pinion 56 which meshes with a bevel gear 57 on a vertical shaft 58 contained within the gear casing 59, said vertical shaft 58 carrying a bevel pinion 60 which meshes with a bevel gear 61 connected with the usual compensating gear (not shown) in the gear casing 62 and driving the axle sections 63. The vertical shaft 58 and bevel pinion 60 and bevel gear 57 thereon used for driving each axle constitute an important feature of the invention, permitting the line of the main driving shaft to be raised eight to ten inches above the ordinary driving shaft, thus raising the working parts of the driving shaft and the transmission gear from the mud, and giving a greater road clearance for the whole car, thus adapting the chassis very advantageously for use in country or rough roads.

The braking mechanism is as follows:— To the brake lever 70 is attached a link 71 which is also attached to a lever 72 secured on a transverse shaft 73 which carries also at its other end a similar lever, each of said levers carrying upper and lower pulleys 75, 76. Around the upper pulley 75 passes a wire cable 77 which is attached to the arms 78 of rock shafts 79 to arms of which are attached the brake bands 80 which surround drums 81 upon the rear axle sections. Around the lower pulleys 76 passes a similar wire cable attached in like manner to levers operating the brakes upon the front wheel. By shifting the lever 70 the lever 72 may be rocked forward, thereby drawing all the brake bands tight upon the drums and braking all the wheels at once.

By the construction now described there is provided a very simple, strong and durable chassis for automobiles, especially adapted for commercial use on account of its simplicity, and durability, and also for pleasure cars for a maximum speed of say, thirty miles an hour. The car is especially adapted for ambulances in military service, mail wagons, stage lines, grocery delivery wagons, milk wagons, and the like, for several reasons; first, it has a very high clearance of the axle above the road bed, thus especially adapting it for country roads in which deep ruts and high centers between the ruts would block an automobile of the ordinary construction; second, the rear wheels follow in the tracks of the front wheels at all angles of turning; third, the car, having a three-point or platform spring suspension at each end, may be driven over rough roads much more easily than cars as at present constructed of the two-wheel driving type; fourth, it will take a complete turn in a circle of about half the diameter that the ordinary two-wheel driven cars require; fifth, it will not slide on wet streets, as a two-wheel driven car will; sixth, on account of the driving power being connected equally to all four wheels, any wheel that drops into a chuck hole will be helped out by all the other wheels; seventh, the braking mechanism is very powerful and efficient; eighth, the steering mechanism is very simple, easy, safe and quick.

I claim:—

1. An automobile comprising a frame, wheel axles, and front and rear fifth wheels supporting said frame upon said axles, each fifth wheel being open in the center and comprising an upper ring and a lower ring turning thereunder, the opposing faces of said rings being grooved to form a runway, balls in said runway, and means for holding said rings together against vertical motion, said means comprising U-clamps secured to one of said rings at suitable intervals, shafts carried at their ends, and a roller on each shaft rolling against the other ring, substantially as described.

2. An automobile comprising a frame, wheel axles, and front and rear fifth wheels supporting said frame upon said axles, each fifth wheel being open in the center and comprising an upper ring and a lower ring turning thereunder, axle casings, reach rods crossing each other diagonally and connected to the ends of the axle casings, and means for securing said axle casings to the lower rings of the fifth wheels, substantially as described.

3. An automobile comprising a frame, wheel axles, and front and rear fifth wheels supporting said frame upon said axles, each fifth wheel being open in the center and comprising an upper ring and a lower ring turning thereunder, axle casings, reach rods crossing each other diagonally and resiliently connected to the ends of the axle casings, and means for securing said axle casings to the lower rings of the fifth wheels, substantially as described.

4. An automobile comprising a frame, wheel axles, and front and rear fifth wheels supporting said frame upon said axles, each fifth wheel being open in the center and comprising an upper ring and a lower ring turning thereunder, axle casings, reach rods crossing each other diagonally and having resilient connections with said axle casing, each connection comprising a clamp-piece secured upon the axle casing and a ball-shaped hanger, a tube secured upon the end of the reach rod, blocks in said tube having concave opposing faces, and a spring within the tube bearing against one of said blocks, substantially as described.

5. An automobile comprising a frame, wheel axles, and front and rear fifth wheels supporting said frame upon said axles, each fifth wheel being open in the center and comprising an upper ring and a lower ring turning thereunder, axle casings, reach rods crossing each other diagonally and having resilient connections with said axle casing, each connection comprising a clamp-piece secured upon the axle casing and a ball-shaped hanger, a tube secured upon the end of the reach rod, blocks in said tube having concave opposing faces, and a spring within the tube bearing against one of said blocks, and a plug adjustably secured against the other block, substantially as described.

6. An automobile comprising a frame, wheel axles, and front and rear fifth wheels supporting said frame upon said axles, each fifth wheel being open in the center and comprising an upper ring and a lower ring turning thereunder, a segment gear secured upon the lower ring of one of the fifth wheels, a pinion engaging said gear, a vertical shaft therefor, a bevel gear carried by said shaft, a steering rod, and a bevel gear carried by said steering rod and engaging the other bevel gear, substantially as described.

In testimony whereof I have hereunto set my hand in the presence of two subscribing witnesses.

CHARLES SNOW.

Witnesses:
 FRANCIS M. WRIGHT,
 D. B. RICHARDS.